Figure 1:
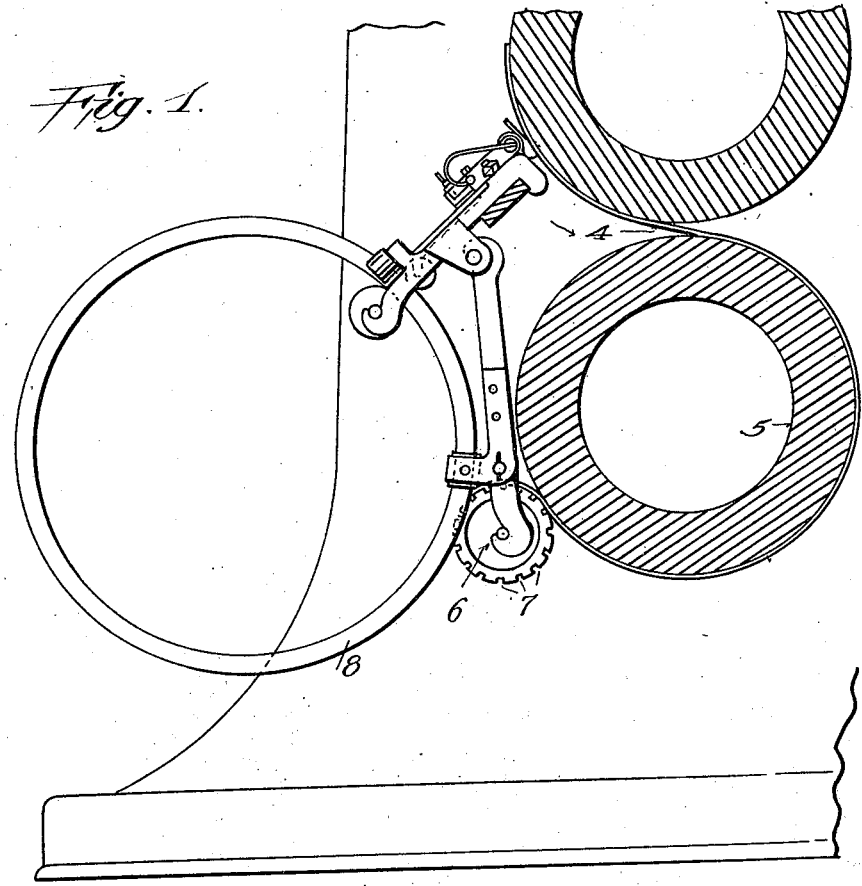

May 22, 1923.

R. McCLENATHEN

RUBBER TIRE FORMING ROLLER

Filed Oct. 10, 1919

1,456,109

Inventor
Robert McClenathen
by his atty Chas W Stapleton

Patented May 22, 1923.

1,456,109

UNITED STATES PATENT OFFICE.

ROBERT McCLENATHEN, OF CUYAHOGA FALLS, OHIO, ASSIGNOR TO KELLY SPRINGFIELD TIRE CO.

RUBBER-TIRE-FORMING ROLLER.

Application filed October 10, 1919. Serial No. 329,858.

*To all whom it may concern:*

Be it known that I, ROBERT McCLENATHEN, a citizen of the United States, residing at Cuyahoga Falls, Summit County, State of Ohio, have invented a new and useful Improvement in a Rubber-Tire-Forming Roller, of which the following is a specification.

In the manufacture of solid rubber tires the rubber portion of the structure is usually built up on the wheel rim in successive layers of unvulcanized thin rubber strips; these strips are prepared and run out on well known rubber calendering machines and passed to the metal rim on which they are superimposed and pressed down, usually by an independent roller, as the wheel rim is revolved for that purpose.

Heretofore the starting of the winding operation has had to be done by hand involving time and expense and affording an opportunity for dirt and air pockets to accumulate between the rubber, and it is well known that the exposure of unvulcanized rubber to the dust leadened atmosphere of a shop, and to contact with soiled and greasy hands, frequently results in imperfect or incomplete adhesion, and it is easily understood that a perfect union of the rubber strips, and of the rubber to the wheel rim is of prime importance. To overcome this I provide a pressure roller which automatically and simultaneously conducts the rubber strip to, and presses the same upon the wheel rim or preceeding layer of rubber as the tire is built up.

I have found that by placing cavities or grooves in the roller affording points for the rubber to cling to, yet not sufficiently prominent to prevent an automatic transfer of the strips to the sticky surface of the metal wheel rim, no hand operation is necessary. With a roller so constructed, and located as shown in the drawing accompanying this application, the rubber strip is automatically picked off from the calender drum, by the roller, carried to the wheel rim and pressed firmly thereon.

On the surface of the roller I make numerous parallel shallow longitudinal grooves and have found that a roller thus grooved accomplishes the object perfectly. While I prefer a roller having alternate grooves and ridges as shown it will be apparent that no specific form or arrangement of grooves or depressions is essential, as a roller provided with projections or with holes or a different arrangement of grooves and ridges would be more or less efficient for the purpose desired and I do not limit myself to any specific form of grooves, ridges, holes or projections, the essential feature being a broken, rough, or uneven surface that will afford a limited lodgment for some portion of the rubber in its passage from the calender drum to the wheel rim.

In order that the functional attributes of my transfer roller may be comprehended in true combination environment with the smooth drum of the calender on which the adhering sheeted stock is carried, and the wheel rim (rotated by frictional engagement with the calender driven transfer roller) and upon which the said transfer roller causes the sheeted stock to be transferred, indirectly, from the calender rolls, it is noted, and well known to the art, that the sheeted stock adheres but slightly to the smooth, polished, calender drum and will readily separate therefrom in the presence of a moderate opposed force. It is also well kown to the art that the wheel rims, or tire bases, upon which the strips of transferred sheeted stock are collected, have a rubber-receiving face treated by working striations and other effective rubber-attracting irregularities therein, in order that the prepared strips shall attach themselves thereto with great tenacity. Also it is obvious that once the periphery of the rim or base has received a coating of sheeted, tacky, stock around its circumference, adhesion of subsequently applied strips in the winding operation, presents no problems—the affinity of tacky rubber for tacky rubber being notorious. Now the transfer roller is provided with rubber-attracting irregularities of greater effectiveness than the polished surface of the cylindrical calender drum, but of less effectiveness than the rubber-attracting irregularities on the receiving face of the rim or base; and, of course, of greatly less effectiveness than the attraction of an applied sheet of rubber on the said rim for successive adhesions of a like material. In view of the above, it is obvious that the purpose and character of the surface irregularities provided on the transfer roller is to arrange an intermediate agency between the stock adhering weakly to the calender and the strong-attracting surface of the wheel rim, whereby the contact of the rubber sheet on the calender drum with the transfer roll will cause a dominant adhesive force to draw the stock thereon, only to have the stock pulled off when contact thereof is had with the surface of the wheel rim, or with previously collected stock thereon.

This application is a more specific protection of certain features partially disclosed in my Patent 1,312,419 dated August 5, 1919, filed January 9, 1919.

Figure 2:
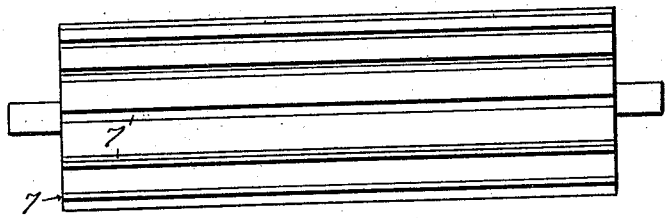
Figure 3:
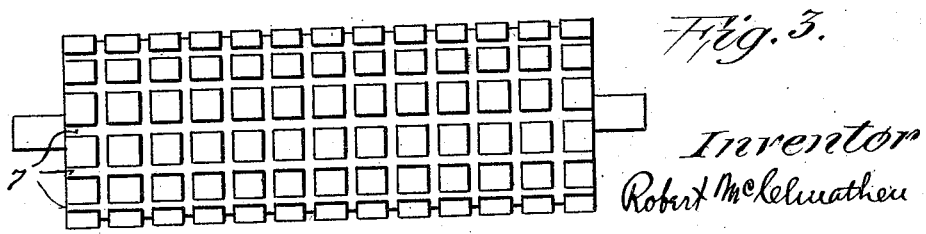

In the annexed drawings Fig. 1, is a side elevation of the lower part of a rubber calender machine in common use also a type of tire forming machine with wheel rim, rubber strip and my grooved pressure roller, all in position for operation. Fig. 2, is a plan view of a conducting pressure roller showing a longitudinal arrangement of grooves. Fig. 3, is the same as Fig. 2, with the addition of circumferential grooves.

The rubber strip 4, adheres to the revolving calender drum 5, and on reaching pressure roller 6, is pressed in to the grooves 7, carried to wheel rim 8, and deposited thereon as the rim is revolved for that purpose.

It will be understood that the calender drums when in use are constantly revolving through independent power applied to the calender machine for that purpose, and by locating the pressure roller in practical contact with both calender drum and wheel rim the drum operates the tire forming machine through the pressure roller. It will be apparent however that my improved roller can be used with tire forming machines of a different construction.

Having described my invention I claim—

1. In a device of the character described, the combination of a rotary rubber-sheeting drum, a revolvable annular wheel rim and supporting means, and a transfer roller interposed between and contacting with both the sheeting drum and the wheel rim, said transfer roller having a gum-retaining affinity greater than the rubber-sheeting drum but less than the wheel rim, whereby sheeted rubber stock is transferred from the drum to the wheel when the former is rotated.

2. In a deviece of the character described, the combination of a rotary rubber-sheeting drum, a revolvable annular wheel rim and supporting means, and a cylindrical idler transfer roller axially mounted in parallelism with the axis of said drum and interposed between and contacting with both the sheeting drum and the wheel rim, said transfer roller having a gum-retaining affinity greater than the rubber-sheeting drum but less than the wheel rim, whereby rotation of the drum rotates both roller and rim and sheeted rubber stock is transferred from the drum to the wheel rim.

ROBERT McCLENATHEN.